June 4, 1963  J. RUBINSTEIN  3,092,161
SCRAPERS FOR SLICING MACHINES
Filed Aug. 29, 1961
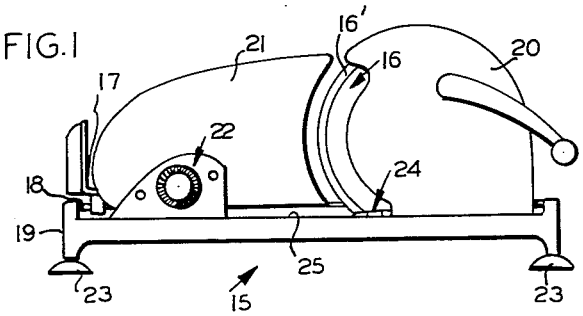
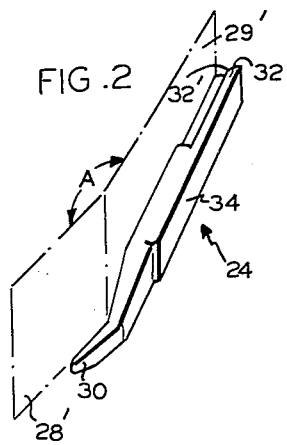
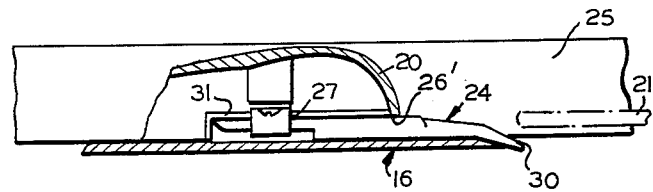
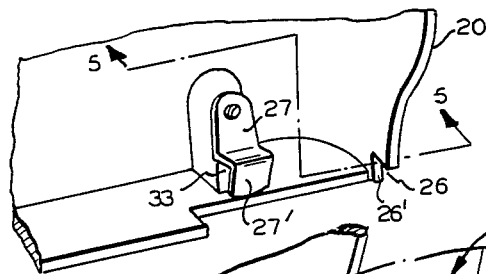
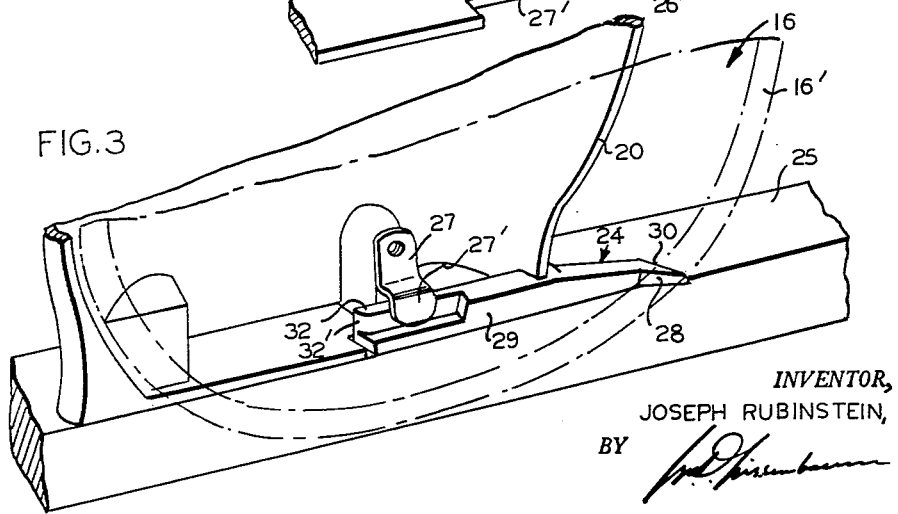
INVENTOR,
JOSEPH RUBINSTEIN,
BY
ATTORNEY.

United States Patent Office 3,092,161
Patented June 4, 1963

3,092,161
SCRAPERS FOR SLICING MACHINES
Joseph Rubinstein, Newburgh, N.Y., assignor to General Slicing Machine Co., Inc., Walden, N.Y., a corporation of New York
Filed Aug. 29, 1961, Ser. No. 134,618
2 Claims. (Cl. 146—102)

The present invention relates to scrapers, for example, associated with rotary disc blades as, for instance, those used in food slicing machines where the food to be sliced is fed by a reciprocatable, slidably mounted carriage which travels to and fro past the cutting edge of the blade. The primary function of the scraper is to strip the slice being cut, from that face of the blade which the slice contacts and further, such scraper acts as a blade wiper.

Heretofore, the scraper in a food slicer was permanently attached. It could not be cleaned of the seepage which collected between itself and the blade. This created a very unsanitary condition. Any wear of the scraper would only increase such seepage. Removal of the scraper required the use of at least a screw driver. When it was put back again, it often did not fit in good wiping contact with the blade.

It is therefore the principal object of this invention to provide a novel and improved scraper and mounting means therefor which holds it in proper position against the blade for efficient action for all its functions, keeps the scraper in good wiping contact with the blade at all times even if there had been some wear and affords easy removal of such scraper to be cleaned or replaced; a simple sliding movement being all that is necessary to mount or detach said scraper from the machine by hand.

A further object thereof is to provide a novel and improved scraper of the character described which is cheap in cost, readily expendable, and whose mounting means is simple and inexpensive.

Still a further object of this invention is to provide a novel and improved scraper and mounting means therefor having the mentioned attributes and which are efficient in carrying out the purposes for which they are designed.

Other objects and advantages will become apparent as this disclosure proceeds.

To explain this invention, I have chosen its adaptation in a food slicing machine as an example of its use, where the blade's housing member offers the mounting means for the scraper element. Here, the scraper is below the food-carrying platform of the carriage which transports the food mass to be sliced; the disc blade being in a vertical plane. The surface of the blade contacted by the scraper is beveled around its perimeter. The scraper is a bar with a flat face to contact the face of the blade and has an angularly extending tip with a flat face to contact and be across and a bit beyond the beveled lane of the blade. Said scraper is positioned (geometrically speaking) along a chord of the circle determined by the blade's periphery. In the embodiment herein illustrated, the scraper which is a rectangular bar, extends horizontally across the exposed portion of the disc blade and in part into the blade housing where it is engaged by a spring from which it is releasable. The scraper rests on a ledge offered by the machine frame and a fulcrum means is provided intermediate the ends of the scraper, so that it can swing a bit on this ledge. The action of the spring is such that not only does it hold the scraper in the assembly, but it also tends to swing it so that the scraper is constantly pushed against the blade surface and good wiping contact is maintained across such surface including that of the beveled perimeter, for the scraper is dimensioned to conform to blade surface contour.

In the accompanying drawing forming part of this specification, similar characters of reference indicate corresponding parts in all the views.

FIG. 1 is an elevational view of a food slicing machine equipped with a scraper and its mount embodying the teachings of this invention.

FIG. 2 is an enlarged perspective view of the scraper element. Its blade-contacting planes are indicated by dash-dot lines.

FIG. 3 is a fragmentary rear view of FIG. 1, drawn to an enlarged scale. To attain clarity of illustration, the disc blade is shown "phantom-wise" by dash-dot lines. In this view, the blade is nearest the observer.

FIG. 4 is like FIG. 3, but only showing the knife housing equipped with the spring which receives and acts on the scraper when inserted and also showing the fulcrum provision.

FIG. 5 is a section taken at lines 5—5 in FIG. 4. Included in this view is the scraper shown in operative position associated with its mounting means and being pressed against the blade surface by the spring which retains it in assembly; the scraper conforming to the blade's surface contour including the outer beveled lane of said blade.

In the drawing, the numeral 15 designates generally a food slicing machine of known type, which though shown hand-operated, may be motor-driven to rotate its disc blade 16 while a food mass on its carriage 17 is transported to and fro beyond the blade's cutting edge; said carriage being slidable along the track means 18 mounted on the machine frame 19, which latter includes a fixed housing 20 covering most of said disc blade 16. There is the usual gage plate 21 mounted in advance of the blade and associated with suitable means indicated at 22 for adjustment of slice thickness and the machine may have suction cups 23 on its feet.

A scraper, indicated generally by the numeral 24, rests on the frame's ledge 25 and conformingly bears against the exposed portion of the blade's face across which said scraper extends, and further, said scraper extends in part into said housing 20 through the notch 26 offering an opening therefor through which it slidingly fits; the mentioned blade face contacted by said scraper 24, being the one which would be contacted by the slice being cut. Within said housing 20, said scraper 24 is releasably engaged by the cantilever spring 27 mounted within such housing, so that the scraper can be mounted or withdrawn by movement along its length as is readily evident in FIG. 3.

The peripheral lane 16' of that surface of the blade 16 which is contacted by the scraper 24, is beveled. Hence, the scraper 24 has the bent tip or finger 30, extending across and contacting said lane. In fact, it is preferred that said finger extend slightly beyond the blade's cutting edge as is shown in FIG. 3. The dihedral angle "A" formed by the scraper's blade-contacting faces 28 and 29, indicated by the planes 28', 29' respectively, conforms with the blade surface contour contacted by said scraper.

To assure a continuous wiping contact of the scraper's faces 28, 29 with the blade 16, the scraper is afforded a swinging movement by a fulcrum intermediate its ends. Such fulcrum is furnished by the scraper's contact with the notch wall 26'; the numeral 31 indicating space permitting movement of the inner end of the scraper 24 away from the blade 16, which is one function the spring 27 performs in addition to holding the scraper in mounted position on the machine. It is evident that that portion of the scraper which is outside the housing, will be resiliently forced against the blade continuously and such required contact of the scraper and blade will be maintained even if there be some wear of the scraper or blade. In practice of course, the scraper 24 is of a softer material than the hardened blade, and such scraper may be of plastic, metal or other suitable material. Since the pressing element 27' of the spring need be between the blade and the scraper in the embodiment shown, said scraper is made thinner at 32 to afford space for said pressing element.

When the reduced section 32 of the scraper is entered and engages the spring 27, the latter is of course stressed. To ease the entrance of said section into the channel 33, its end 32' is rounded or tapered.

The scraper 24 is an elongated member whose central section is preferably of rectangular cross-section. As mentioned, in the embodiment shown, it rests on the ledge 25 and offers a vertical wall 34 against the notch wall 26' which acts as a fulcrum. It is evident that continuous wiping contact is automatically maintained by the scraper against the cutting disc and that the scraper is easily mounted and just as easily removable for cleaning and replacement. It is advisable that the scraper be of material having some resilient quality to aid wiping and scraping action.

The scraper taught herein is for blades which move in one direction during operation of the machine and hence is easily adaptable for slicing machines using endless belt blades, in which case a straight lane of blade passes the scraper instead of the circular lane when the blade is a rotary disc. This is readily understood by those versed in the art without further pictorial illustration, as well as the use of the scraper as only a wiper, in which case it is across the blade at any region where the blade edge does no actual cutting.

This invention is capable of numerous forms and various applications without departing from the essential features herein disclosed. It is therefore intended and desired that the embodiment herein shall be deemed merely illustrative and not restrictive and that the patent shall cover all patentable novelty herein set forth; reference being had to the following claims rather than to the specific description herein to indicate the scope of this invention.

I claim:

1. In a slicing machine of the type having a cutting blade which moves continuously in one direction while the machine is in operation, and being provided with a frame, a scraper positioned on said frame of the machine against that face of the blade which is in contact with a slice being cut away from the mass; said scraper being in wiping contact with said blade face and one end thereof extending substantially to the cutting edge of said blade, means on the machine affording an axis serving as a fulcrum contacting a surface of said scraper, about which fulcrum said scraper has some turning movement, whereby said end of the scraper will move against said blade face; said scraper being intermediate the blade and said fulcrum, spring means releasably holding said scraper on the machine, biasing said scraper to turn on said fulcrum so that the said one end of the scraper is maintained against said blade face and the wiping relation between said scraper and blade is automatically maintained, and a blade housing secured to the frame on a ledge on such frame; said housing covering a portion of said blade face; said spring means and scraper in part, being within said housing; that part of the scraper which is outside the housing, being on the exposed part of the blade; said scraper resting on said ledge and slidable therealong; said housing being provided with a notch through which the scraper is fitted for longitudinal sliding movement; a wall of said notch serving as said fulcrum and said notch serving to guide said scraper in its movement to and from said spring means; said scraper being removable from the machine by merely a longitudinal sliding movement in one direction on said ledge and mountable into use position by merely a longitudinal sliding movement in the opposite direction on said ledge whereby said scraper becomes engaged by said spring means; said spring means being the only part of the machine engaging said scraper, and only the manual manipulation of said scraper being required to remove and mount it on the machine.

2. A slicing machine as defined in claim 1, wherein the scraper is an elongated piece in wiping contact along substantially its entire length with said blade face.

References Cited in the file of this patent

UNITED STATES PATENTS

| | | |
|---|---|---|
| 1,419,552 | Freed | June 13, 1922 |
| 1,616,388 | Philaditakis | Feb. 1, 1927 |
| 1,952,838 | Campbell | Mar. 27, 1934 |
| 1,957,190 | Wood | May 1, 1934 |
| 2,047,476 | Johnston | July 14, 1936 |